US008135708B2

(12) United States Patent
Morton

(10) Patent No.: US 8,135,708 B2
(45) Date of Patent: *Mar. 13, 2012

(54) RELEVANCE RANKED FACETED METADATA SEARCH ENGINE

(75) Inventor: John Morton, Austin, TX (US)

(73) Assignee: BNA (Llesiant Corporation), Arlington, VA (US)

(*) Notice: Subject to any disclaimer, the term of this patent is extended or adjusted under 35 U.S.C. 154(b) by 446 days.

This patent is subject to a terminal disclaimer.

(21) Appl. No.: 11/544,531

(22) Filed: Oct. 6, 2006

(65) Prior Publication Data

US 2008/0010263 A1  Jan. 10, 2008

Related U.S. Application Data

(60) Provisional application No. 60/818,654, filed on Jul. 5, 2006.

(51) Int. Cl.
*G06F 17/30* (2006.01)

(52) U.S. Cl. ........ 707/728; 707/726; 707/727; 707/731; 707/777

(58) Field of Classification Search .......... None
See application file for complete search history.

(56) References Cited

U.S. PATENT DOCUMENTS

| | | |
|---|---|---|
| 5,428,778 A | 6/1995 | Brookes |
| 5,537,586 A | 7/1996 | Amram et al. |
| 5,655,118 A | 8/1997 | Heindel et al. |
| 5,760,770 A | 6/1998 | Bliss et al. |
| 5,788,504 A | 8/1998 | Rice et al. |
| 5,795,155 A | 8/1998 | Morrel-Samuels |
| 5,799,304 A | 8/1998 | Miller |
| 5,829,983 A | 11/1998 | Koyoma et al. |
| 5,890,152 A | 3/1999 | Rapaport et al. |
| 5,911,140 A | 6/1999 | Tukey et al. |
| 5,983,214 A | 11/1999 | Lang et al. |
| 5,983,221 A | 11/1999 | Christy ............... 707/5 |
| 6,006,217 A | 12/1999 | Lumsden ............ 707/2 |
| 6,006,227 A | 12/1999 | Freeman et al. |
| 6,012,053 A * | 1/2000 | Pant et al. .......... 707/3 |
| 6,029,161 A | 2/2000 | Lang et al. |
| 6,044,376 A | 3/2000 | Kurtzman, II |
| 6,049,782 A | 4/2000 | Gottesman et al. |
| 6,119,114 A | 9/2000 | Smadja |
| 6,182,067 B1 | 1/2001 | Presnell et al. |
| 6,236,987 B1 | 5/2001 | Horowitz et al. |
| 6,236,994 B1 | 5/2001 | Swartz et al. |
| 6,275,820 B1 | 8/2001 | Navin-Chandra et al. |

(Continued)

FOREIGN PATENT DOCUMENTS

WO   2008005493 A3   1/2008

OTHER PUBLICATIONS

Wikipedia, "Faceted classification," Oct. 4, 2006, pp. 1-2.

(Continued)

*Primary Examiner* — Farhan Syed
(74) *Attorney, Agent, or Firm* — Toler Law Group, IP

(57) ABSTRACT

One embodiment of the invention may include a method for searching data files using different search engines, each of which produces different search results. The different search results may then be combined to produce additional search results that represent the relevance of the data files. Other embodiments are described and claimed.

15 Claims, 4 Drawing Sheets

U.S. PATENT DOCUMENTS

| | | | |
|---|---|---|---|
| 6,317,718 B1 | 11/2001 | Fano | |
| 6,345,256 B1 | 2/2002 | Milsted et al. | |
| 6,345,298 B1 | 2/2002 | Malone et al. | |
| 6,587,848 B1 | 7/2003 | Aggarwal et al. | |
| 6,643,652 B2 | 11/2003 | Helgeson et al. | |
| 6,711,585 B1 | 3/2004 | Copperman et al. | |
| 6,721,747 B2 | 4/2004 | Lipkin | |
| 6,760,047 B2 | 7/2004 | Hough et al. | |
| 6,795,820 B2* | 9/2004 | Barnett | 707/3 |
| 6,938,046 B2* | 8/2005 | Cooke et al. | 707/101 |
| 7,039,594 B1 | 5/2006 | Gersting | |
| 7,072,934 B2 | 7/2006 | Helgeson et al. | |
| 7,091,885 B2 | 8/2006 | Fux et al. | |
| 7,111,237 B2 | 9/2006 | Chan | 715/2 |
| 7,149,983 B1* | 12/2006 | Robertson et al. | 715/810 |
| 7,177,859 B2 | 2/2007 | Pather et al. | |
| 7,206,780 B2 | 4/2007 | Slackman | |
| 7,325,201 B2* | 1/2008 | Ferrari et al. | 715/737 |
| 2001/0032121 A1 | 10/2001 | Le | |
| 2002/0042733 A1 | 4/2002 | Lesandrini et al. | |
| 2002/0099678 A1 | 7/2002 | Albright et al. | |
| 2002/0099694 A1* | 7/2002 | Diamond et al. | 707/3 |
| 2002/0128908 A1 | 9/2002 | Levin et al. | |
| 2002/0169764 A1 | 11/2002 | Kincaid | |
| 2003/0120502 A1 | 6/2003 | Robb et al. | |
| 2003/0204433 A1 | 10/2003 | Botscheck et al. | |
| 2004/0024739 A1* | 2/2004 | Copperman et al. | 707/1 |
| 2005/0187923 A1 | 8/2005 | Cipollone | |
| 2006/0004703 A1 | 1/2006 | Spivack et al. | |
| 2007/0027861 A1 | 2/2007 | Huentelman et al. | |
| 2007/0050361 A1* | 3/2007 | Al-Masri | 707/7 |
| 2007/0050393 A1 | 3/2007 | Vogel et al. | |
| 2007/0208693 A1* | 9/2007 | Chang et al. | 707/2 |

OTHER PUBLICATIONS

Wikipedia, "Search engine," Oct. 4, 2006, pp. 1-6.
Wikipedia, "Metadata," Sep. 28, 2006, pp. 1-9.
Webdesignpractices, "Use of Faceted Classification," Oct. 2003, pp. 1-3.
GB 0713073.5, Search and Examination Report, UK Intellectual Property Office, 2007.
PCT/US2007/015476, International Search Report mailed Oct. 17, 2008.
PCT/US2007/015476, Written Opinion of ISA mailed Oct. 17, 2008.
Requirement for Restriction/Election for U.S. Appl. No. 11/849,410 received from the United States Patent and Trademark Office (USPTO), mailed Mar. 12, 2010, 7 pages.
Non-Final Office Action for U.S. Appl. No. 11/849,410 received from the United States Patent and Trademark Office (USPTO), mailed May 7, 2010, 14 pages.
Final Office Action for U.S. Appl. No. 11/849,410 received from the United States Patent and Trademark Office (USPTO), mailed Nov. 8, 2010, 20 pages.
Non-Final Office Action for U.S. Appl. No. 11/544,783 received from the United States Patent and Trademark Office (USPTO), mailed Sep. 29, 2008, 26 pages.
Final Office Action for U.S. Appl. No. 11/544,783 received from the United States Patent and Trademark Office (USPTO), mailed Feb. 23, 2009, 27 pages.
Non-Final Office Action for U.S. Appl. No. 11/544,783 received from the United States Patent and Trademark Office (USPTO), mailed Oct. 7, 2009, 23 pages.
Final Office Action for U.S. Appl. No. 11/544,783 received from the United States Patent and Trademark Office (USPTO), mailed Mar. 25, 2010, 20 pages.
Notice of Allowance and Fees Due for U.S. Appl. No. 11/544,783 received from the United States Patent and Trademark Office (USPTO), mailed Apr. 22, 2011, 17 pages.
Non-Final Office Action for U.S. Appl. No. 10/346,166 received from the United States Patent and Trademark Office (USPTO), mailed Mar. 27, 2008, 9 pages.
Final Office Action for U.S. Appl. No. 10/346,166 received from the United States Patent and Trademark Office (USPTO), mailed Oct. 14, 2008, 8 pages.
Non-Final Office Action for U.S. Appl. No. 10/346,166 received from the United States Patent and Trademark Office (USPTO), mailed Mar. 6, 2009, 10 pages.
Final Office Action for U.S. Appl. No. 10/346,166 received from the United States Patent and Trademark Office (USPTO), mailed Sep. 29, 2009, 10 pages.

* cited by examiner

RELEVANCE RANKED FACETED METADATA SEARCH ENGINE

This application claims priority to U.S. Provisional Patent Application No. 60/818,654 filed on Jul. 5, 2006 in the name of John Morton, entitled RELEVANCE RANKED FACETED METADATA SEARCH METHOD.

BACKGROUND

A search engine or search service is a program designed to help find information stored on a computer system such as the World Wide Web, a network, intranet, or personal computer. For example, a search engine may allow a user to search for content meeting specific criteria, such as those containing a given word or phrase, and retrieves a list of references that match those criteria. Search engines may use regularly updated indexes to help expedite the searches.

Search engines attempt to provide the user with search results consisting of relevant documents. To determine relevancy, many search engines use search methods such as link popularity and PageRank. In such methods, the number of other web sites and web pages that link to a given page (i.e., data file) may be taken into consideration in determining the relevancy of that particular page, on the premise that desirable pages are linked to more often than less desirable pages. For example, the number of linking pages and the number of links on these pages contribute to the PageRank of the linked data file. Such search engines then order their search results according to the PageRank. PageRank is but one of many criteria used to determine relevancy. For example, when searching through various data files stored on a database, a search tool may determine the relevance of a data file based on the number of times a search term is repeated in the data file. Further still, other search tools may determine the relevancy of a data file based where the search term is located in the date file (e.g., file name).

Unfortunately, search engines still lack the ability to consistently provide the most relevant data files to the user. As mentioned above, many search queries are limited to searching for key words. This methodology may result in many false positives, especially using the default page-wide search. Furthermore, the key words are often scattered across large pages of data with no preference or discrimination given to the varied key words. In short, with the majority of search engines, the user is left with little control over determining what document is truly relevant. Consequently, the user must often sift through large numbers of data files, many of which are of questionable relevancy.

DETAILED DESCRIPTION

Figure 1:
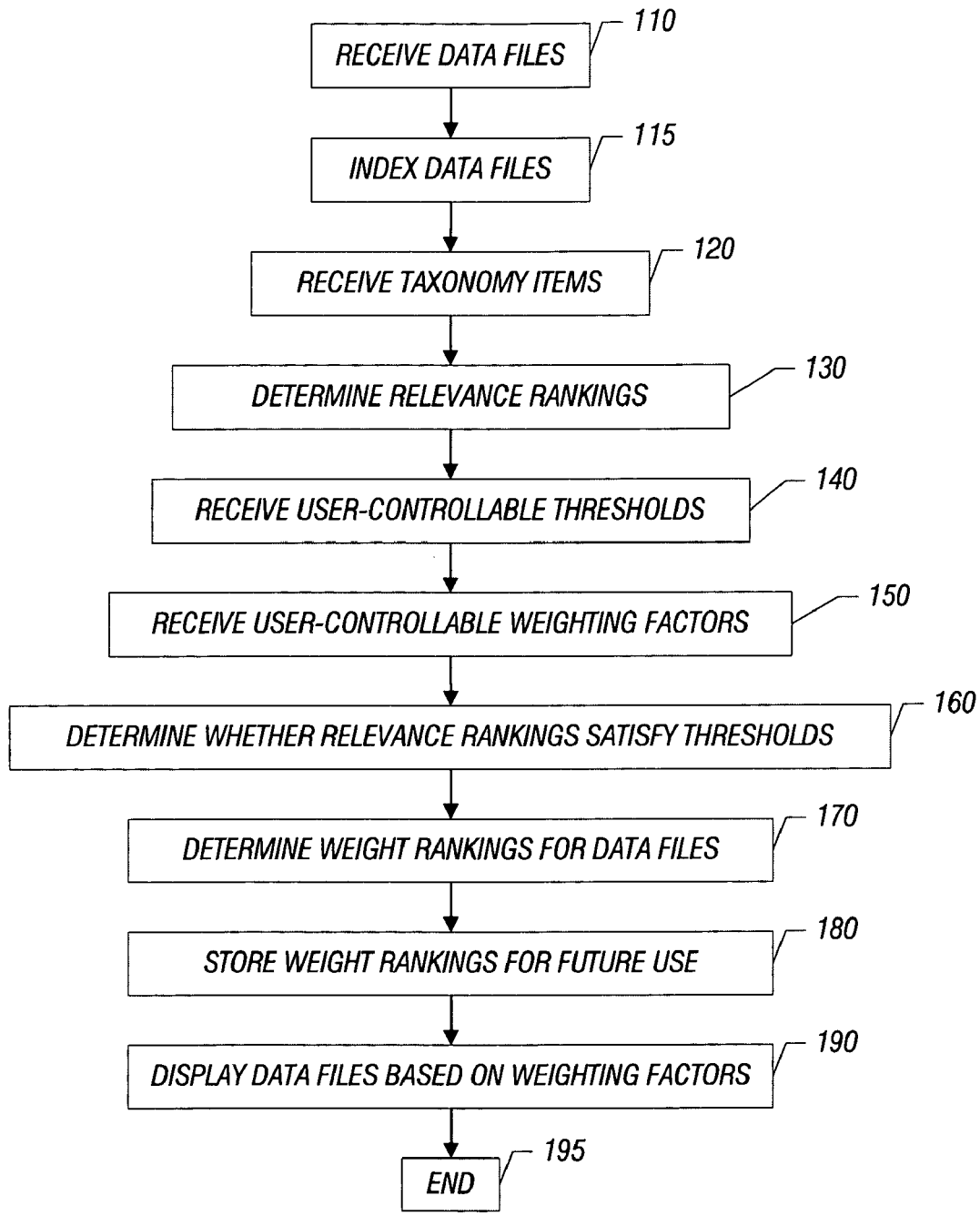
FIG. 1 is a flow diagram of a method for searching data files in one embodiment of the invention.

FIG. 1 is a flow diagram of a method for obtaining relevant data files in an embodiment of the invention. In block 110, a plurality of data files are received from a data source such as, for example, the World Wide Web, and stored in a database. The data files may exist in, for example only, a human readable format such as extensible markup language (XML) format. Data files not already existing in XML format may be transformed into a standard XML form. For example, files in portable document format (PDF) or tagged image file format (TIFF) may be converted into an XML format using techniques known to those of ordinary skill in the art. The files, regardless of format, may then be gathered into a database or database network and organized using, for example, a table of content items that categorizes the data files by their content source (e.g., *Wall Street Journal*). In one embodiment of the invention, a database using Microsoft SQL Server 2005 may be utilized.

In certain embodiments of the invention, the data files may include news articles such as those found in the *New York Times* and the *Wall Street Journal*. The data files may be obtained in any number of ways, including obtaining them using a news aggregator such as Comtex News Network, Inc., located at 625 North Washington Street, Suite 301, Alexandria, Va. 22314. Under contractual agreements with institutions such as the Associated Press, a news aggregator may collect a large number of data files from data sources such as the aforementioned newspapers, journals, on-line books, or even picture libraries containing PDF or TIFF files. The aggregator may bundle the data files using, for example, file transfer protocol (FTP). The data files may then be transferred to a central database or database network under the FTP. Data files may be gathered into a database using other methods as well. For example, instead of using a news aggregator, data files may be obtained directly from publishers of magazines and journals. Furthermore, web spiders or web crawlers known to those of ordinary skill in the art may be utilized to access data files placed on, for example, the World Wide Web.

Still referring to block 110, the data files may contain metadata in certain embodiments of the invention. The use of metadata may help increase search speeds in comparison to, for example, full text searching. Furthermore, use of metadata may help a user search for information without having to use complicated queries associated with full text searching. In addition, metadata can help facilitate searching by not requiring exact matches to search terms. Metadata may contain structured, encoded data that describes characteristics of a file with which it is associated. For example, a user may conduct a search of data files stored in a database. Those data files may include a newspaper article that mentions, for example, a company's president but not the company name itself. If the user conducts a full text search of the files using a search string that includes the company name, but not the name of the president, the file may not be produced in the search results. However, metadata may be used to link the president's name to the company. Consequently, a search directed towards the company name will still produce the aforementioned data file due to the metadata association between the company name and the company president's name. Thus, metadata helps facilitate searching of electronic information.

As those of ordinary skill in the art will appreciate, the data files received into the database in block 110 may include metadata of many different forms. In one embodiment of the invention, metadata may be associated with XML tags (i.e., objects or fields) such as <Source>, <Country>, <Company>, and <Keyword Metadata>. For example, articles from the *Wall Street Journal* may include these same metadata fields while, in contrast, the *New York Times* may populate its articles with metadata concerning those same fields as well as the <Industry> field. In addition to metadata, the data files may also include text (i.e., non-metadata) located in, for example, the body of a news article.

As alluded to above, to accumulate data files for a searchable database, search queries may be used to locate data files on, for example, a server or the World Wide Web. When relevant search terms are found in such data files, the data files may be added to the database. Also, the search terms used to locate the data files may themselves (the search terms) be stored as metadata coupled to the data file. The newly entered metadata may then be searched at a later time.

In FIG. 1, block 115, the text for data files that have been received may be indexed if the task has not already been accomplished. There are various methods of indexing known to those of ordinary skill in the art. Indexing the text of the incoming data files may facilitate full-text searching, as will later be described more fully.

Figure 4:
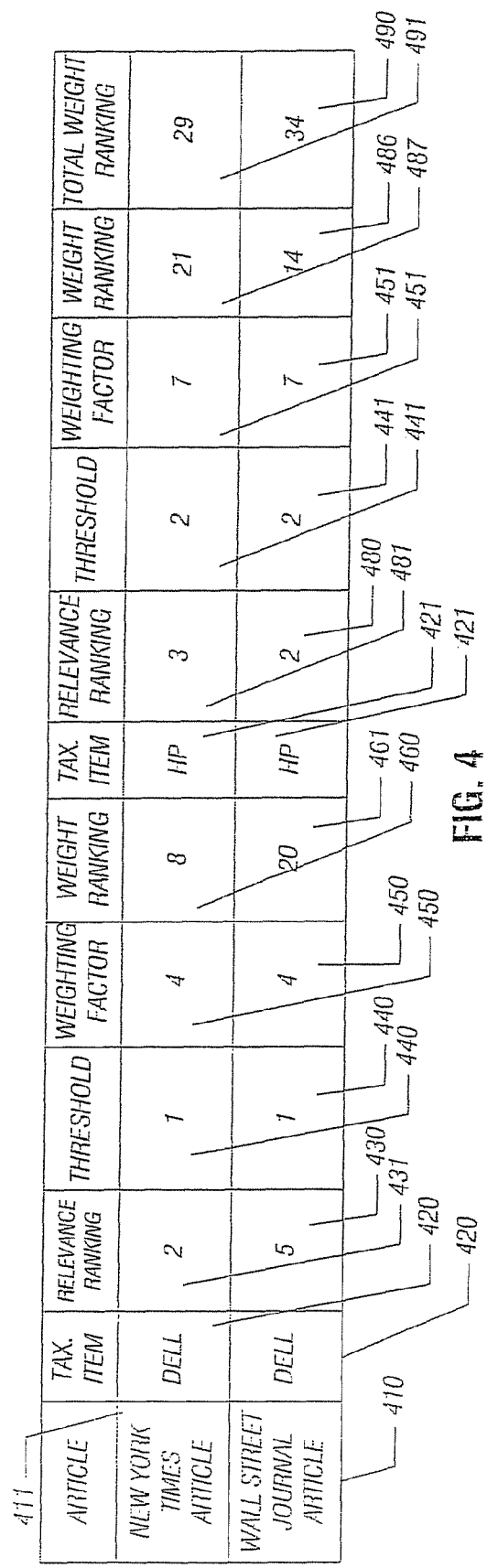
FIG. 4 shows a graphical user interface used in an embodiment of the invention.

In block 120, a taxonomy item is received from a faceted taxonomy system. A faceted taxonomy classification system may assign multiple classifications or taxonomy facets to an object (e.g., data file), thereby allowing searching and browsing of a data file through several classes. In other words, in a faceted taxonomy classification, subjects are divided into facets that provide a user multiple navigation paths to any one aspect (e.g., data file). For example, a newspaper article from the Wall Street Journal can be classified using taxonomy facets such as <Source>, <Country>, <Company>, <Keywords>, and <Industry>. Taxonomy facets contain taxonomy items. As shown in FIG. 4, one example of a taxonomy item 420 may be "Dell" while another such taxonomy item 421 may be "HP." Thus, a Wall Street Journal article may be navigated to using either "Dell" or "HP" taxonomy items. These taxonomy items and metadata may be used, in many different manners, to determine whether a data file is relevant to a user. For example, these taxonomy items may be used to search data file fields that include metadata. Thus, one embodiment of the invention employs faceted metadata searches. Other uses of taxonomy items and metadata are further explained below. In addition, these taxonomy items and full text, which may not constitute metadata, may also be used, in many different manners, to determine whether a data file is relevant to a user. For example, the taxonomy items may be used to search fields in the data files that include only text, or text in addition to metadata. Other uses of taxonomy items and full text are further explained below.

In block 130, a relevance ranking, based on taxonomy items, is determined for the data files, or a subset of the data files, in the database. As indicated in FIG. 4, example taxonomy items 420, 421 may include "Dell", "HP", or any other identification term or item of interest. Thus, in one embodiment of the invention, as data files 410, 411 are entered into the database, they will be analyzed in regard to their relationship to taxonomy items 420, 421. In other embodiments of the invention, the analysis is accomplished before the data file is entered into the database.

The following example concerns how a relevance ranking is determined and applies regardless of when the relevance ranking is calculated. If "HP" appears in the <Company>, and <Keyword> fields of a data file 411, the invention may assign a high relevance ranking 481 between that particular data file 411 and the facet item "HP" 421. However, if another data file 410 includes the term "HP" only in the body of the data file, that file may receive a low relevance ranking 480 in regard to the taxonomy item "HP" 421. As can be seen in the example of FIG. 4, the New York Times data file or article 411 has a relevance ranking 431 of "2" for the "Dell" taxonomy item 420 and a relevance ranking of 481 of "3" for the taxonomy item "HP" 421. In addition, the Wall Street Journal article 410 has a relevance ranking for both taxonomy items 420, 421. For the "Dell" taxonomy item 420, the Wall Street Journal article 410 has a relevance ranking of "5" 430. The Wall Street Journal article 410 has a relevance ranking 480 of "2" for the "HP" taxonomy item 421. If a data file were to have no occurrences of a certain taxonomy item, the relevance ranking between that file and the taxonomy item may be "0." The relevance ranking may be stored as metadata in the data file. A user may then search the relevance rankings, stored in metadata, to locate relevant files.

As those of ordinary skill in the art will appreciate, there are many available methods to determine a relevance ranking. In one embodiment of the invention, the ranking is determined using a search engine such as the dtSearch Text Retrieval Engine for Win & NET, available from dtSearch Corp., located at 6852 Tulip Hill Terrace, Bethesda, Md. 20816. However, those of ordinary skill in the art will understand that other methods for obtaining relevancy rankings are known and readily available in the art. For example, relevancy rankings may be accomplished based on searches of many different forms of information, including metadata and text. Regarding metadata, a search for the taxonomy item "Dell" 420 may be conducted for all the metadata in the New York Times article 411 and the Wall Street Journal article 410. For example, a user interface may include a pulldown menu for a taxonomy facet <company> whereby "Dell" is a selectable taxonomy item within the taxonomy facet. Selecting the "Dell" taxonomy item may induce a metadata search for that term. Regarding a full text search, "Dell" may also be searched for in the body of the articles 410, 411 using a full text search. For example, there may also be a wildcard free text entry field whereby the user enters "Dell" and thereby induces a full text search of the data file. Both metadata and full text searches may be available in cooperation with one another or may be selected independently from one another. For example, a taxonomy item such as "Dell" may be searched for in metadata without utilizing a full text search for "Dell." However, both a full text search and a metadata search for the "Dell" taxonomy item may also be accomplished. Either or both taxonomy items 420, 421 may be searched in the metadata and/or full text of selected data files such as 410, 411.

Using both metadata and full text searching may increase the ability to determine whether a given document is relevant. As mentioned above, a full text search may locate data files that a metadata search may fail to locate. Using one taxonomy item for a full text search and a second taxonomy item for a metadata search may help produce very accurate relevance rankings. A user may later search the relevance rankings based on one or more taxonomy items.

As mentioned above, once the relevancy rankings between data files and taxonomy items have been determined, the relevance rankings may be stored as metadata in the data file. In one embodiment of the invention, the relevancy rankings may be organized in the database using a table of relevance ranked relationships. Later searches may be accelerated because relevancy rankings in the metadata already exist between taxonomy items and data files. This prevents the need for ad-hoc searches that can be computationally expensive. For example, one need not search metadata fields (e.g., <author>, <company>) or full text because the user may instead search the relevance rankings that correspond to individual data files and taxonomy items. This methodology results in quickly locating the most relevant data files in a manner easily navigated by the user.

Where no relevancy ranking exists between a taxonomy item and a data file, an "on the fly" taxonomy item entry may be used. For example, a wildcard entry such as "Compaq" could be typed and used as a taxonomy item in a full text search and/or a metadata search. Thus, the user is not limited to predetermined and pre-ranked taxonomy items. The ability to couple searching of previously ranked metadata to "on the fly" searching (e.g., in text or metadata) for items that have not been previously ranked can greatly increase a user's ability to locate relevant data files. In certain embodiments of the invention, the results (i.e., relevancy rankings) may be discarded after viewing the files. However, in other embodiments of the invention, the relevancy rankings may be retained in, for example, the aforementioned table of relevance ranked relationships. Inclusion in this table will facilitate quick, accurate relevance ranked faceted metadata searches. In other words, the wildcard search term can become a taxonomy item that may be used in future searches of relevance rankings for relevance data files. Thus, if a user determines that the full text search and/or metadata search of a newly created taxonomy item (e.g., "Compaq") was valuable, the relevancy rankings for that taxonomy item and data files may be stored in metadata to expedite future searches for those files using taxonomy items and the relevance rankings. The taxonomy item "Compaq" could then, as an example, be available as a selectable taxonomy item via a pull down menu associated with a taxonomy facet such as "company."

In block 140 of FIG. 1, an embodiment of the invention is described whereby a user-controllable threshold 440, 441 is received for one or more taxonomy items. For example, in FIG. 4, a user may set a threshold of "1" 440 for the taxonomy item "Dell" 420. In addition, a threshold of "2" 441 may be selected for the taxonomy item "HP" 421. Thus, in this hypothetical scenario, the user has chosen that documents relevant to Dell should more easily satisfy the threshold than documents relevant to HP. A user may thereby control the relevancy of documents obtained from a database. For example, if by experience the user determines that the searches described in FIG. 4 produce too many documents concerning HP, many of which are not relevant to the user, the user may increase the threshold 441 and thereby retrieve documents with higher relevancy ratings.

Again referring to block 140 and FIG. 4, a user may determine that she is only interested in documents from the *New York Times*. In other words, the user may desire to search all data files in a database and return documents only if they are from the *New York Times*. In such a situation, the user interface may provide a pulldown menu for threshold values including only two options, such as "0" and "100". A user selecting "100" for the above scenario would only retrieve documents from the *New York Times*. For other taxonomy items such as <Keyword> or even the text body of the data file, a pulldown menu may include values such as "0", "10", "20" . . . "100" allowing for more varied threshold levels. In other embodiments of the invention, the threshold value may be manually entered by the user as a "wildcard" value such as "62." Those of ordinary skill in the art will understand there are many other methods not listed here for inputting a threshold value.

In block 150 of FIG. 1 and FIG. 4, one embodiment of the invention is described whereby a user-controllable weighting factor for each taxonomy item is received. For example, a user has input a weighting factor 450 of "4" for the taxonomy item "Dell" 420. However, the user has assigned a higher weighting factor 451 of "7" for the taxonomy item "HP" 421. In an alternative embodiment of the invention, different data sources may use different weighting factors for the same taxonomy item. For example, a user may choose a higher weighting factor for "Dell" in *Wall Street Journal* articles (e.g., 65) than for "Dell" in *New York Times* articles (e.g., 24).

In block 160 of FIG. 1, the *New York Times* and *Wall Street Journal* data files 410, 411 shown in FIG. 4 are evaluated against threshold values 440, 441. For example, the *New York Times* article 411 has a relevancy ranking of "2" 431 for the "Dell" taxonomy item 420. Thus, the article 411 satisfies the threshold value of "1" 440. In addition, the *New York Times* article 411 has a relevancy ranking of "3" 481 for the "HP" taxonomy item 421. Thus, the article 411 satisfies the threshold of "2" 441. Accordingly, the *New York Times* article 411 passes or satisfies the thresholds 440, 441. The *Wall Street Journal* article 410 also has relevancy rankings 430, 480 (e.g., "5, "2") which pass its respective thresholds 440, 441 (e.g., "1", "2") for the taxonomy items 420, 421. In alternative embodiments of the invention, a threshold can be applied wherein any of several taxonomy items will suffice. For example, the presence of any of three country taxonomy items (e.g., France, Germany, and Chile) in a <country> taxonomy facet may satisfy the threshold for that data file.

In block 170 of FIG. 1, a weight ranking 460, 461, 486, 487 is determined for the data files 410, 411 based on the user-controllable weighting factors 450, 451. FIG. 4 addresses one embodiment of the invention whereby the *New York Times* article 411 receives a weight ranking of "8" (461) based on the multiplication of its relevancy ranking "2" (431) and weight factor "4" (450). For the HP taxonomy item 421, the *New York Times* article 411 receives a "21" weight ranking (487) based on its relevancy ranking 481 and weight factor 451 value for that taxonomy item. Weight rankings 460, 486 are established for each taxonomy item (e.g., "Dell", "HP") for the *Wall Street Journal* article 410 as well. Those values are respectively "20" 460 and "14" 486. In one embodiment of the invention, the weight rankings for each document may then be combined as shown in FIG. 4 into an additional weight ranking 490, 491. For example, the *New York Times* article 411 has two weight rankings, of "8" 461 and "21" 487, which may be summed together for a total weight ranking of "29" 491. For the *Wall Street Journal* article 410, weight rankings of "20" 460 and "14" 451 may be summed together to yield a value of "34" 490. Thus, in this example, the *New York Times* article has a lower total weight ranking than that of the *Wall Street Journal*. Those of ordinary skill in the art will understand that the above is just an example of how weight rankings are arrived at and, in one embodiment of the invention, combined with one another. In another embodiment of the invention, a weighted average may be used to calculate the total weight ranking 490, 491. For example, the total weight ranking 491 may be calculated using aforementioned values 460, 487, 451, 450 as follows: (8+21)/(7+4)=2.64. The total weight ranking 490 may be calculated using aforementioned values 461, 486, 451, 450 as follows: (20+14)/(7+4)=3.09.

In block 180 of FIG. 1, the data files 410, 411 and weight rankings 460, 461, 486, 487, 490, 491 may be stored for later use. For example, the data files and weight rankings may be stored in nonvolatile or volatile memory as described further in reference to FIG. 3.

In block 190 of FIG. 1, the stored data files and weight rankings may be used for display purposes. For example, in FIG. 4 search results of the database may produce the *New York Times* article 411 and the *Wall Street Journal* 410 because both satisfied their respective thresholds 440, 441. In addition, the *New York Times* article 411 may be displayed below or after the *Wall Street Journal* article 410 because it has a lower combined weight ranking 490, 491. In an additional embodiment of the invention, search results may be grouped to remove, for example, duplicate data files using techniques known to those of ordinary skill in the art. In alternative embodiments of the invention, all relevant results may be stored and sent to a user, via electronic mail, at prescribed time intervals. In further embodiments of the invention, only a certain number of data files, such as the top three priority documents based on weight rankings 460, 461, 486, 487 and/or 490, 491, may be sent to the user.

In block 195, the method described in FIG. 1 ends. While a hypothetical scenario involving newspaper articles has been described at length herein, those of ordinary skill in the art will understand that the invention is not limited to these embodiments. For example, a database or portion of a database storing PDF or TIFF images may be the subject of a search inquiry. Metadata may be assigned to photographs stored in TIFF format. The metadata may be searched as described herein to help sort the photographs. Image tagging services, such as Flickr®, may be used to populate metadata for such photographs. For example, an image of a shirt may be analyzed for its content of certain colors. An image of a solid blue shirt may be said to be 100% blue. In contrast, a blue shirt with white stripes may be analyzed to be 50% blue. This color content information can be stored in metadata. Then, using the thresholds and weighting factors described herein, a user may search numerous TIFF files to locate a picture of shirt (e.g., shirt is a taxonomy item in a taxonomy facet for men's clothing) that is greater than 75% blue (e.g., blue is a taxonomy item in a taxonomy facet for color).

Figure 2:
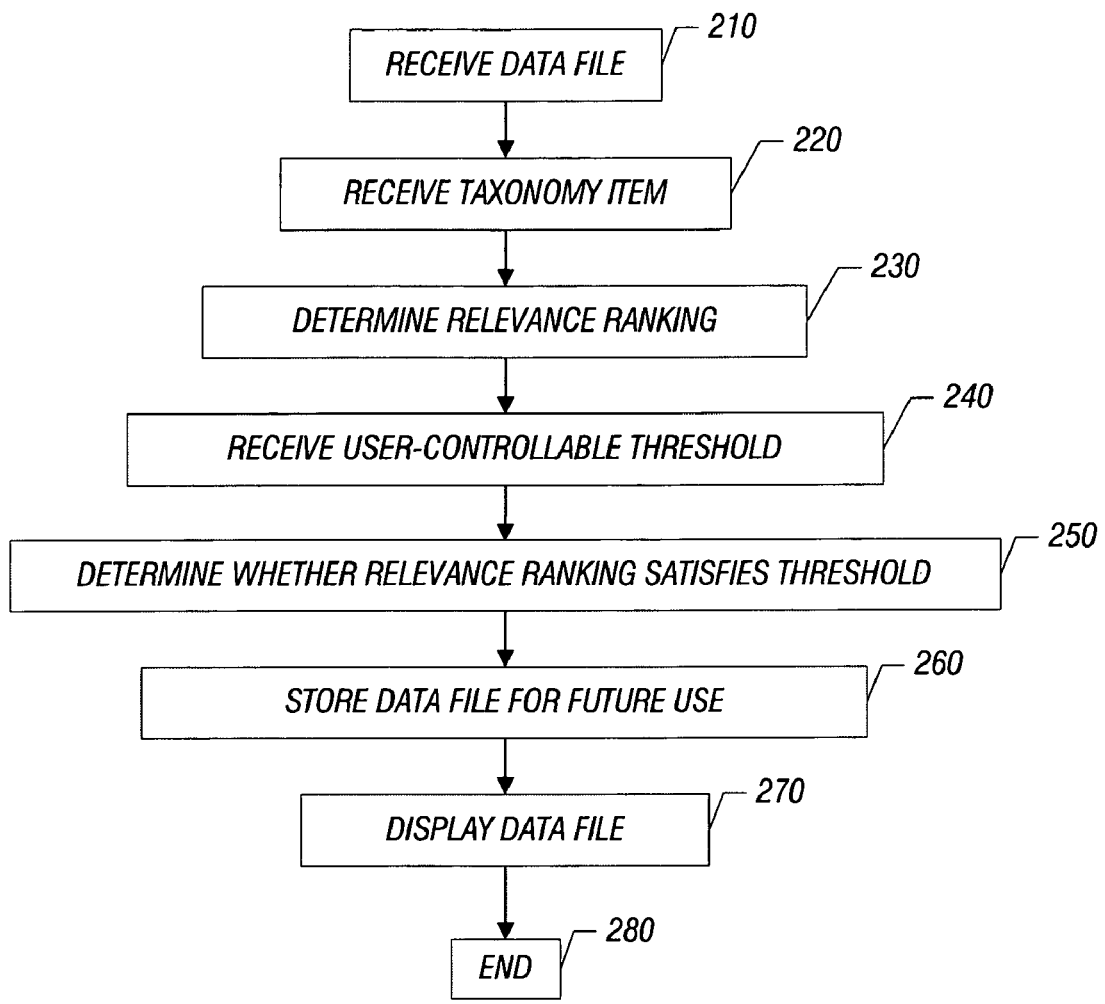
FIG. 2 is a flow diagram of a method for searching data files in an alternative embodiment of the invention.

FIG. 2 is a flow diagram of a method for searching a data file in an alternative embodiment of the invention. In block 210, a data file is received. In block 220, a taxonomy item is received. In block 230, a relevance ranking is determined for the data file based on the taxonomy item. A user may then search for relevant files using the relevance rankings and the taxonomy items. The relevance rankings may be stored in metadata to facilitate faster searching. In some embodiments of the invention, further steps may be taken. For example, in block 240, a user-controllable threshold is received for the taxonomy item. In block 250, the data file is evaluated against a threshold value. In block 260, the data file may be stored for later use. In block 270, the stored data file may be displayed using a display 337 as illustrated in FIG. 2. In block 280, the method ends.

Other methods for searching data files exist in alternative embodiments of the invention. For example, data files may be received. Taxonomy items may also be received. Relevance rankings may then be determined for the data files based on the related taxonomy items. User-controllable weighting factors may then be received for the taxonomy items. A weighting ranking may be determined for the data files based on the taxonomy items. The data files and weighting rankings may then be stored for later use. For example, the stored data files may be displayed based on the stored weighting rankings.

Still other embodiments of the invention are now described. As mentioned above, many search tools (e.g., search engines) exist for determining relevancy rankings. As those of ordinary skill in the art will appreciate, entity extraction is one such tool. In addition, a relevancy ranking may be derived based on the frequency in which a term appears in a document. Furthermore, a relevancy ranking may be determined based on where a term appears in a document (e.g., title, abstract, key words, and main body). Thus, using multiple methods (i.e., search engines) to establish relevancy for a data file may result in multiple relevancy rankings for the same taxonomy item and data file. For example, one relevancy ranking for a given taxonomy item may be based on metadata. For example, whether a taxonomy item, or term related thereto (e.g., a word that is not an exact match to the taxonomy item), is found in metadata. A person of ordinary skill in the art will appreciate that a relevancy ranking for a taxonomy item may be based on metadata in numerous other ways as well. In addition, another relevancy ranking for the same taxonomy item may be based on a full text search of the data file. Further still, relevancy rankings for the same data file and same taxonomy item may be imported from other entities such as the search engine from dtSearch or Copernic Desktop Search, available from Copernic Technologies Inc. In one embodiment of the invention, multiple search engines may be used to produce multiple relevancy rankings, all for the same taxonomy item. Therefore, by using several relevancy rankings from different sources (i.e., search engines), a more accurate relevancy ranking for the data file may be obtained.

In one embodiment of the invention, a user may choose to create relevance rankings for data files using multiple search tools or search engines. For example, a user may choose to obtain relevance rankings for the data files in a database for the taxonomy item "Dell." The user may choose to search the files using multiple search engines. Each search engine may be associated with a threshold value. Thus, a first search engine may have a threshold value of "20" while a second search engine has a threshold value of "30". Searches may be executed, relevance rankings established, and a data file may be produced if the data file satisfies the threshold for each search engine. In some embodiments of the invention, the relevancy rankings for each of the multiple search engines may be combined. Thus, a relevancy ranking between a taxonomy item and a data file may be based on, for example, an average relevance. The average relevance ranking may be the average of multiple relevance rankings, each of which is from a different search engine. The average may be a weighted average in some embodiments of the invention. In some embodiments of the invention, the different search engines may be associated with different weighting factors. Thus, for more desirable search engines, a user may assign a higher weighting factor. For example, a relevance ranking for a taxonomy item such as "Dell" may be based primarily on the relevance ranking produced from a first search engine, but also on the relevance ranking from a second search engine. The relevance rankings from each search engine may have previously been evaluated to determine whether they satisfied a threshold.

In certain embodiments of the invention, a user display may compare relevance rankings from individual search engines to combined relevance rankings based on multiple search engines. As a result, the efficacy of different search engines, or combinations thereof, may be easily compared to one another.

As mentioned above, in some embodiments of the invention different search engine relevance rankings may be assigned different thresholds and weighting factors. In addition, in some embodiments of the invention, the relevance rankings from different search engines may be "rectified" or "normalized" so they are comparable to one another. As those of ordinary skill in the art will appreciate, many commercially available search engines apply correction factors to their version of relevancy ranking. For example, if a search engine finds two data files of marginal relevance, it may assign a top relevance of 100, on a scale of 1-100, to the most relevant of the two files regardless of the fact that neither file is particularly relevant. Thus, removing the correction factor may be advantageous when combining relevancy rankings from different search engines, all of which may use different non-standardized correction factors. Such a removal yields an "absolute value" of sorts for the relevancy ranking for each of the varied search engine's rankings. For example, when gathering data files into a database, a user may use multiple news aggregators. Each news aggregator may supply data files with relevance rankings already calculated for certain taxonomy items. However, when combining files into the database from these various aggregators, the relevancy rankings may first need to be rectified (i.e., normalized) to a common standard.

As those of ordinary skill in the art will appreciate, embodiments of the invention may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 3:
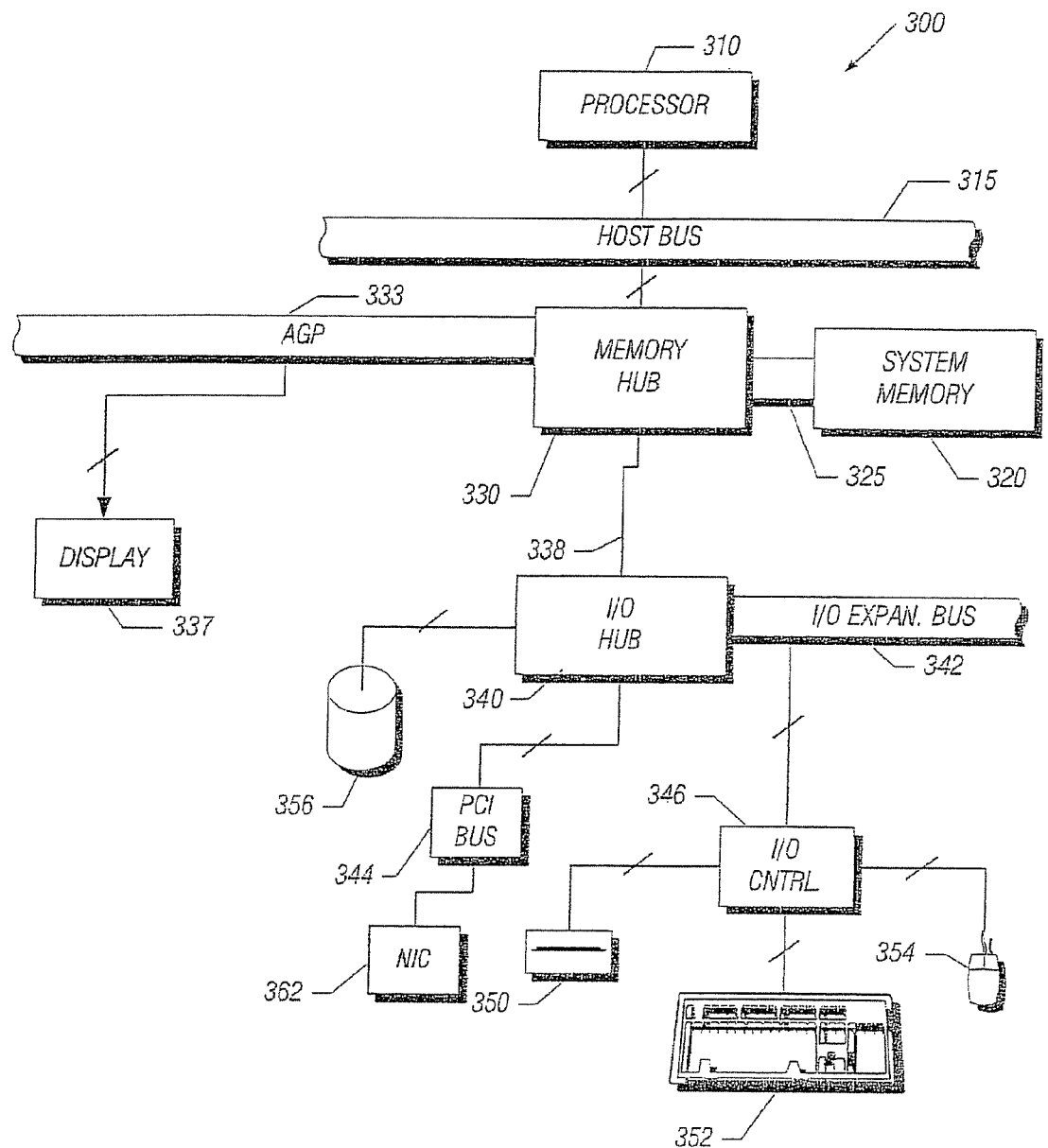
FIG. 3 is a block diagram of a system with which embodiments of the present invention are used.

FIG. 3 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, ASIC, a programmable gate array (PGA), and the like. The processor 310 may be coupled over a host bus 315 to a memory hub 330 in one embodiment, which may be coupled to a system memory 320 via a memory bus 325. The memory hub 330 may also be coupled over an Advanced Graphics Port (AGP) bus 333 to a display 337.

The memory hub 330 may also be coupled (via a hub link 338) to an input/output (I/O) hub 340 that is coupled to an input/output (I/O) expansion bus 342. The I/O expansion bus 342 may be coupled to an I/O controller 346 that controls access to one or more I/O devices. As shown in FIG. 3, these devices may include, in one embodiment of the invention, storage devices such as a disk drive 350 and input devices, such as keyboard 352 and mouse 354. The I/O hub 340 may also be coupled to, for example, a hard disk drive or server 356. Furthermore, the I/O hub 340 may be coupled to a PCI bus 344 and a network interface card (NIC) 362. Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
obtaining a first relevance ranking of a taxonomy item in a particular data file using a first search engine;
obtaining a second relevance ranking of the taxonomy item in the particular data file using a second search engine that is different from the first search engine;
receiving a first user-controllable weighting factor to apply to the first relevance ranking obtained using the first search engine;
receiving a second user-controllable weighting factor to apply to the second relevance ranking obtained using the second search engine;
normalizing the first relevance ranking and the second relevance ranking;
responsive to the first relevance ranking satisfying a relevance threshold, obtaining a third relevance ranking based on the first relevance ranking, the first user-controllable weighting factor, the second relevance ranking, and the second user-controllable weighting factor;
storing the particular data file and the third relevance ranking for future use;
obtaining a fourth relevance ranking of the taxonomy item in an additional data file using the first search engine;
obtaining a fifth relevance ranking of the taxonomy item in the additional data file using the second search engine;
obtaining a sixth relevance ranking based on the fourth relevance ranking and the fifth relevance ranking; and
producing search results for the particular data file and the additional data file based on the third relevance ranking and the sixth relevance ranking,
wherein each of the first relevance ranking and the second relevance ranking are not based on data files other than the particular data file.

2. The method of claim 1, wherein the third relevance ranking is based on an average of the first relevance ranking and the second relevance ranking.

3. The method of claim 1, wherein the first relevance ranking is based on metadata of the particular data file.

4. The method of claim 1, wherein the first relevance ranking is based on a full text search of the particular data file.

5. A system comprising:
a processor; and
a memory storing instructions executable by the processor to:
obtain a first relevance ranking of a taxonomy item in a particular data file using a first search engine;
obtain a second relevance ranking of the taxonomy item in the particular data file using a second search engine that is different from the first search engine;
receive a first user-controllable weighting factor to apply to the first relevance ranking obtained using the first search engine;
receive a second user-controllable weighting factor to apply to the second relevance ranking obtained using the second search engine;
normalize the first relevance ranking and the second relevance ranking;
responsive to the first relevance ranking satisfying a relevance threshold, obtain a third relevance ranking based on the first relevance ranking, the first user-controllable weighting factor, the second relevance ranking, and the second user-controllable weighting factor;
store the particular data file and the third relevance ranking for future use;
obtain a fourth relevance ranking of the taxonomy item in an additional data file using the first search engine;
obtain a fifth relevance ranking of the taxonomy item in the additional data file using the second search engine;
obtain a sixth relevance ranking based on the fourth relevance ranking and the fifth relevance ranking; and produce search results for the particular data file and the additional data file based on the third relevance ranking and the sixth relevance ranking, wherein each of the first relevance ranking and the second relevance ranking are not based on data files other than the particular data file.

6. A non-transitory computer-readable storage medium storing instructions that, when executed by a processor, cause a computer to:

obtain a first relevance ranking of a taxonomy item in a particular data file using a first search engine;

obtain a second relevance ranking of the taxonomy item in the particular data file using a second search engine that is different from the first search engine;

receive a first user-controllable weighting factor to apply to the first relevance ranking obtained using the first search engine;

receive a second user-controllable weighting factor to apply to the second relevance ranking obtained using the second search engine;

normalize the first relevance ranking and the second relevance ranking;

responsive to the first relevance ranking satisfying a relevance threshold, obtain a third relevance ranking based on the first relevance ranking, the first user-controllable weighting factor, the second relevance ranking, and the second user-controllable weighting factor;

store the third relevance ranking;

obtain a fourth relevance ranking of the taxonomy item in an additional data file using the first search engine;

obtain a fifth relevance ranking of the taxonomy item in the additional data file using the second search engine;

obtain a sixth relevance ranking based on the fourth relevance ranking and the fifth relevance ranking; and produce search results for the particular data file and the additional data file based on the third relevance ranking and the sixth relevance ranking, wherein each of the first relevance ranking and the second relevance ranking are not based on data files other than the particular data file.

7. The computer-readable storage medium of claim 6, further comprising instructions that, when executed by the computer, cause the computer to obtain the third relevance ranking based on an average of the first relevance ranking and the second relevance ranking.

8. The computer-readable storage medium of claim 6, further comprising instructions that, when executed by the computer, cause the computer to base the first relevance ranking on whether the taxonomy item or a term related to the taxonomy item appears in metadata of the particular data file.

9. The computer-readable storage medium of claim 6, further comprising instructions that, when executed by the computer, cause the computer to base the first relevance ranking on an imported relevance ranking in the particular data file from a supplier of the particular data file.

10. The method of claim 1, wherein the third relevance ranking is stored as metadata of the particular data file.

11. The method of claim 1, further comprising:
sending a plurality of normalized relevance rankings to a display device to enable a user to compare efficacies of a plurality of search engines.

12. The method of claim 1, wherein the first relevance ranking is included in the particular data file by a supplier of the particular data file.

13. The method of claim 1, wherein the first relevance ranking is based on a frequency that one or more terms associated with the taxonomy item appear in text of the particular data file.

14. The method of claim 1, wherein the first relevance ranking is based on where one or more terms associated with the taxonomy item appear in text of the particular data file.

15. The method of claim 1, wherein the first relevance ranking is based on whether one or more terms associated with the taxonomy item appear in metadata of the particular data file.

* * * * *